March 27, 1962 H. M. SMITH, JR 3,026,767
COPY HOLDER FOR MULTIPLE EXPOSURES
Filed Jan. 8, 1959 3 Sheets-Sheet 1

INVENTOR.
HARRY M. SMITH, JR.
BY
ATTORNEYS

March 27, 1962 H. M. SMITH, JR 3,026,767
COPY HOLDER FOR MULTIPLE EXPOSURES
Filed Jan. 8, 1959 3 Sheets-Sheet 2
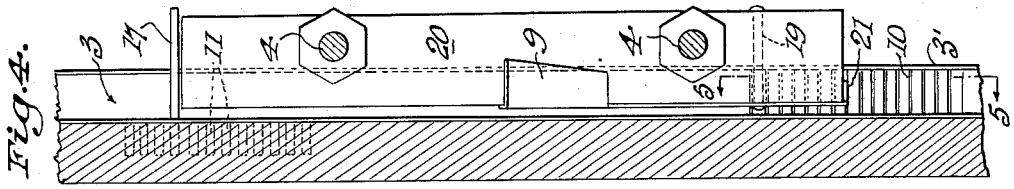
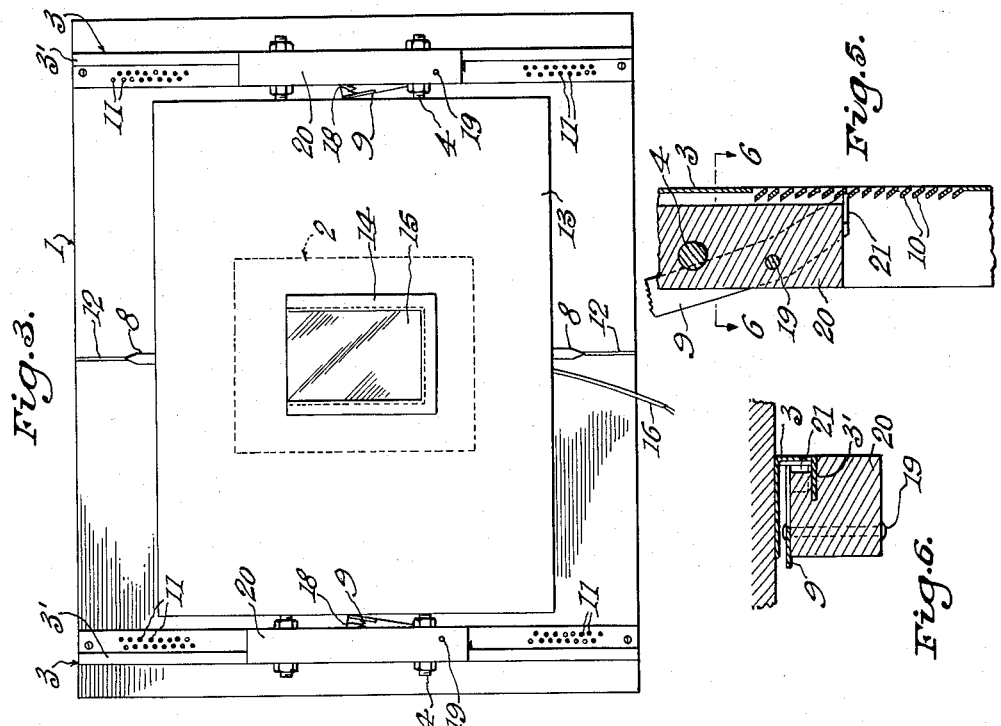
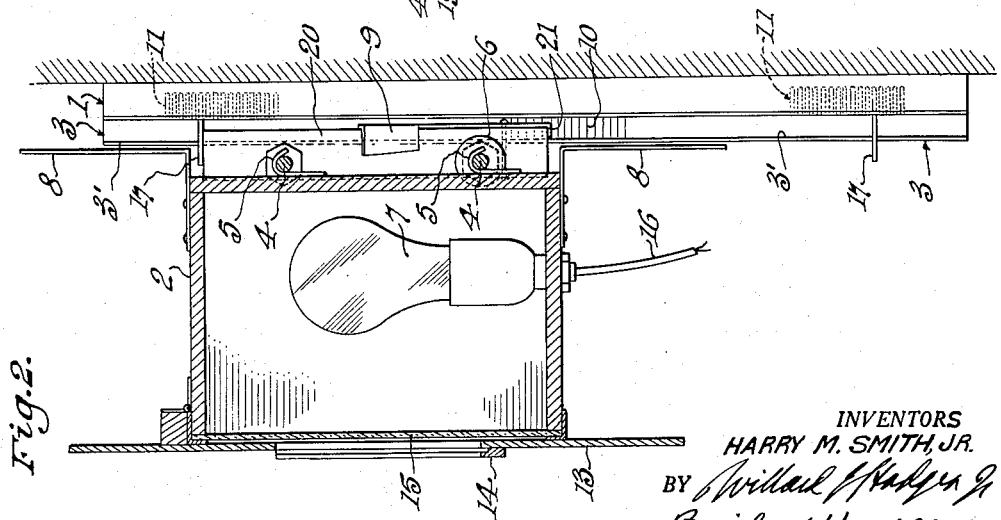
INVENTORS
HARRY M. SMITH, JR.
BY
ATTORNEYS March 27, 1962 H. M. SMITH, JR 3,026,767
COPY HOLDER FOR MULTIPLE EXPOSURES
Filed Jan. 8, 1959 3 Sheets-Sheet 3

INVENTOR.
HARRY M. SMITH, JR.
BY
ATTORNEYS

3,026,767
COPY HOLDER FOR MULTIPLE EXPOSURES
Harry M. Smith, Jr., 6810 Indian Run Parkway,
Alexandria, Va.
Filed Jan. 8, 1959, Ser. No. 785,766
4 Claims. (Cl. 88—24)
(Granted under Title 35, U.S. Code (1952), sec. 266)

The invention described herein may be manufactured and used by or for the Government for governmental purposes without the payment of any royalty thereon.

This invention relates to a novel means of producing a plurality of separate latent photographic images on a single sheet of light sensitive material through the use of a movable copy holder.

Originally in the art, in making copies of slides or negatives for reduction or other reasons, it has been necessary to take each copy subject and photograph it separately on a plate with a resultant waste of time and materials. Later, single plate multiple photographic reproduction was developed through screening of the negative through means upon or within the camera itself, such as movable lensboards or movable plate means. It is apparent that such modifications to the camera demand cirtical tolerances and furthermore are expensive and can limit the particular camera to copywork only.

It is a general object of this invention to provide simple and economical means for reproducing a number of slides and other copy upon a single plate through the use of a movable light box type copy holder mounted upon an easel.

It is another object of this invention to produce multiple exposures upon a single plate without requiring a special camera or one that has been modified for such purpose.

The present invention allows photographing multiple copies all upon one sensitized surface, without sacrificing any range of independent treatment of the copy subject as to exposure intensity, size of negative, etc. The finished product differs not at all from a product where a separate plate was used for each copy subject.

The invention is described herein as contemplating the copying of color slides, negatives and other transparencies, however, it will be obvious to those skilled in the art that the principle utilized could be applied to other copy subjects as well, with little or no modification.

In the accompanying drawings—

FIG. 2 is a vertical section taken on the line 2—2 of FIG. 1;

FIG. 3 is a front elevation of the invention;

FIG. 4 is an enlarged vertical section taken on the line 4—4 of FIG. 1;

FIG. 5 is an enlarged vertical section taken on the line 5—5 of FIG. 4;

FIG. 6 is a horizontal section taken on line 6—6 of FIG. 5; and

Figure 1:
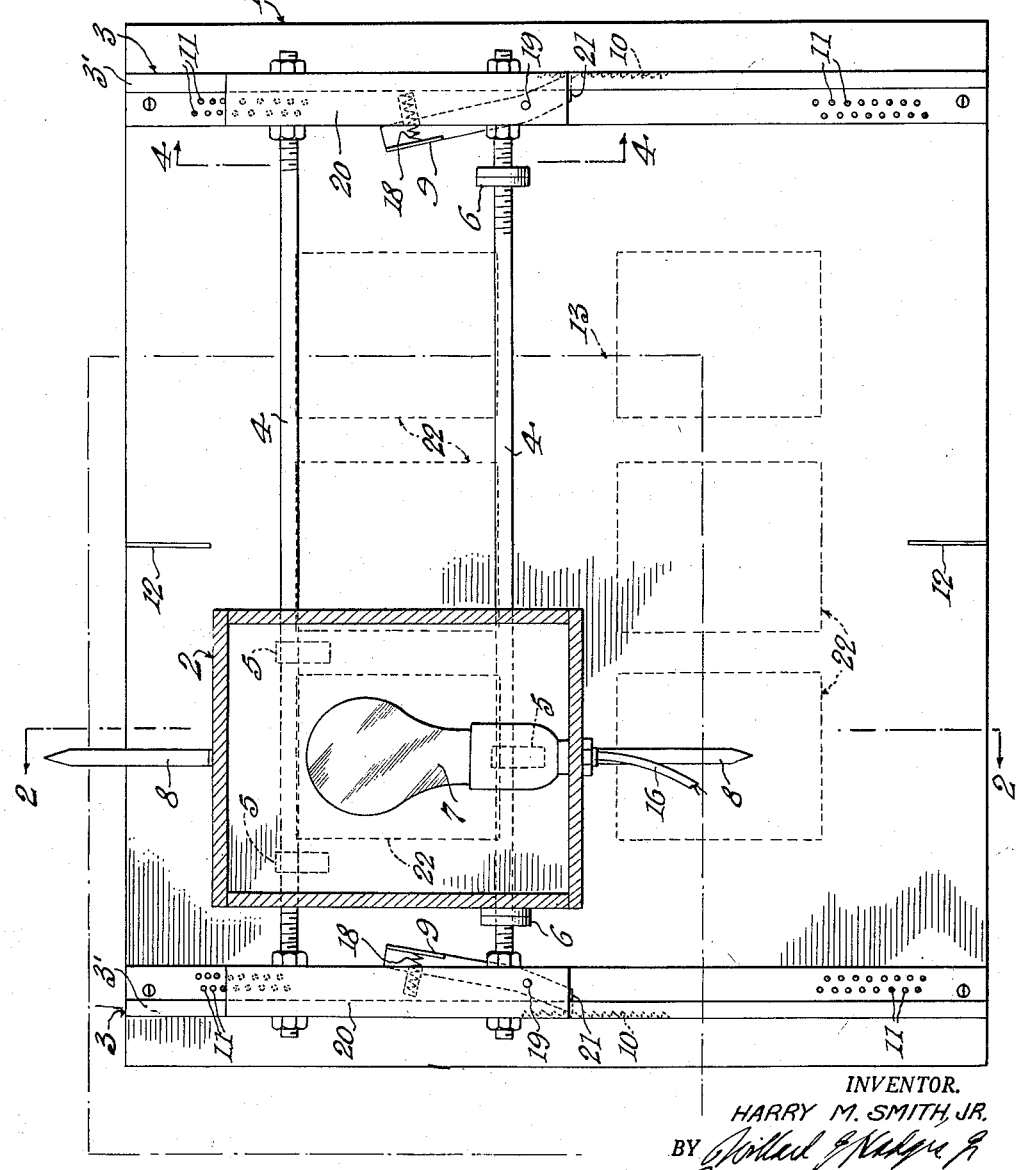
FIG. 1 is a front elevation of the invention partly in section.
Figure 9:
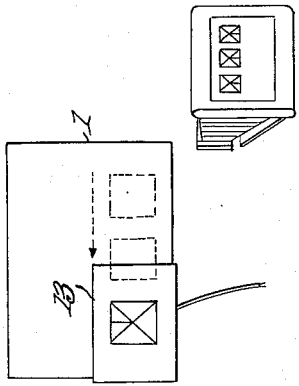
FIGS. 7 through 12 show the relation of the light box to the easel for different copy subject positions with the corresponding image in the camera ground glass.
Figure 12:
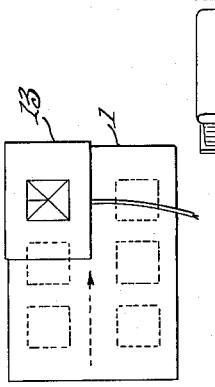

Referring more particularly to the drawings, it will be seen that the invention comprises easel 1 upon which are vertically mounted two strips 3, which are flanged to form guide rails 3'. Riding within the guide rails are blocks 20 which are grooved longitudinally to engage the rails 3'. Running transversely of the easel 1 and bolted at either end to blocks 20 is a pair of cross bars 4, which bars support light box 2 by means of hooks or hangers 5, the light box 2 containing a light bulb 7 and glass plate 15. Protruding vertically and coincident with the center line of box 2 in an upward and downward direction are pointers 8. The bottom cross bar has stops 6 at either end. At the bottoms and tops of strips 3 are series of spaced holes 11, the reason for which will be later described. Hingedly affixed to blocks 20 by hinge pins 19 are stops 9 which are releasable through springs 18. The stops 9 have feet 21 which abut against notches 10 in strips 3 when springs 18 are not depressed. The location and extent of the notches 10 are governed by the extent of vertical travel desired for the light box 2. Easel 1 has markers 12 at its top and bottom center for a purpose which will be hereinafter described. Shown in dotted lines at 22 are the six positions which the aperture of light box 2 assumes during the operation of the invention in this particular embodiment.

FIG. 2 shows the details of the light box arrangement including the front opaque shielding 13 which insures that only the selected position of the aperture will be registered by the camera. The vertical movement of box 2 is limited by pegs 17 which fit into any of the holes 11. FIG. 3 additionally shows the copy holder 14 with the glass plate 15 for the light box aperture and the electric cord 16 leading to the light source. FIG. 4 also shows the limiting structure of pegs 17 and holes 11 and the relation of foot 21 of stop 9 to the notches 10. FIG. 5 shows the notch arrangement from the side, while FIG. 6 shows the guide rail of strip 3 and how it interfits with the grooved block 20.

Figure 8:
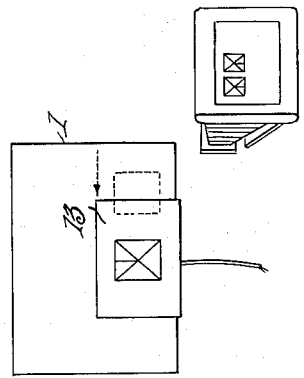
Figure 11:
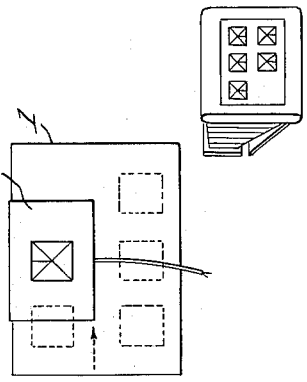
Figure 7:
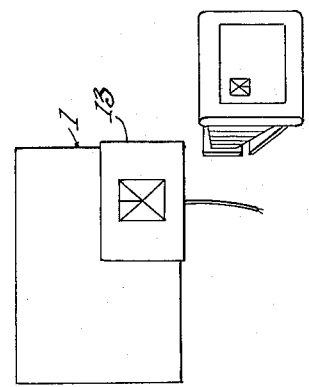
Figure 10:
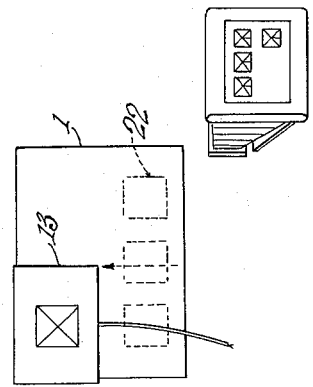

The operation of the invention is simple. As illustrated in FIGS. 7 through 12, the light box aperture is for a 5″ x 5″ transparency or negative and the camera is positioned so as to reduce the image to one-sixth of the area of the camera ground glass. It is apparent that any size negative transparency could be used and reduced to any desired size merely by size and position changes of the copy holder or the camera. A transparency or negative is placed in the copy holder 14 and the light turned on in the light box. As shown in FIG. 7 the light box is shifted to the extreme lower right, being limited by right hand stop 6 and lower pegs 17, which are fitted in the desired peg stops 11. The light box 2 is moved right or left along cross bars 4 manually, the hooks or hangers 5 allowing such movement. The box is lowered to the limiting pegs by depressing stops 9 which pull the feet 21 away from the notches 10, whereupon the blocks 20 and the cross bars which depend on them are free to be raised or lowered. It is seen that in the lowered position, the entire block and cross bar arrangement rests on the lower pins 17. The camera is then focused and the ground glass image is checked. The copy film is then introduced into the camera and the exposure is made in accordance with known photographic techniques. A proper safelight may be used throughout the operation. It is seen that only the upper left one-sixth of the copy film is in effect exposed and the exposure is that of the transparency or negative. This is because the light shining through the transparency or negative is the only source that can affect the copy film. The shield 13 is preferably black as is the easel 1. The light box 2 is obviously light-tight except for the glass plate 15. The net result is that the copy film remains effectively unexposed over five-sixth of its area and further exposures of it are possible. The light box 2 is then shifted left so that pointers 8 and markers 12 coincide, which automatically places the light box in position for a lower center exposure as shown in FIG. 8. The last exposure in the lower group is made by positioning the box against left hand stop 6. To position the box as shown in FIG. 10, the blocks 20 are moved upward against the pegs 17 which have been pre-positioned. The feet 21 spring against the notches 10 and hold the copy holder in place. The peg holes 11 as shown are 16 in number on the top and bottom of each strip 3 which correspond to the number of notches 10, so that 16 vertical positions can be accommodated. The position as shown in FIG. 11 is accomplished by moving the box to the right again coinciding markers 12 with pointers 8. The last position (FIG. 12) is reached by moving the box against right hand stop 6.

It is apparent that with the use of a larger easel with additional intermediate markers 12 and peg stops 11 and notches 10, other exposure positions could be added, allow more exposures per sheet of copy film. Further, if copy material other than transparencies or negatives were used, the light box 2 could be dispensed with, and an external light source would be used to expose such material, care being taken that the immediate area surrounding the copy material was a lustre-less black. Many other changes in design may be made without departing from the spirit of the invention.

I claim:

1. For use with a camera, in producing a plurality of separate latent images upon a single photographic plate, a copy holder comprising a light box having a light source and an aperture; a copy frame for receiving the material to be copied mounted on said light box and extending adjacent the periphery of said aperture; a background easel of greater area than said copy frame; means slidably mounting said light box for movement horizontally along said easel measured distances comprising parallel bars extending horizontally across the face of said easel, hook means attached to said light box and slidably engaging said parallel bars, said bars having end stop means to limit the horizontal movement of said light box, pointer means extending normally from the top and bottom sides of said light box and corresponding markers on said easel for aligning said light box and said easel; and means for moving said light box vertically along said easel measured distances.

2. For use with a camera in producing a plurality of separate latent images upon a single light sensitive plate, a copy holder comprising a light box having a light source and an aperture; a copy frame for receiving material to be copied mounted on said light box and extending adjacent the periphery of said aperture; a background easel of greater area than said copy frame; means slidably mounting said light box for movement horizontally along said easel measured distances including parallel bars extending horizontally across the face of said easel, hook means attached to said light box and slidably engaging said parallel bars, said bars having end stop means to limit the horizontal movement of said light box, pointer means extending normally from the top and bottom sides of said light box and corresponding markers on said easel for aligning said light box and said easel; and means for moving said light box vertically along said easel measured distances including a vertical flanged guide at either end of said easel, grooved blocks riding on the flanges of said guides, said parallel bars connected to said blocks, notches intermediate the ends of said guides, spring actuated stop means hingedly affixed to said blocks cooperating with said notches for holding said blocks in position along said guides, and spaced peg holes at either end of said guides for insertion of pegs for selectively limiting the vertical movement of said blocks.

3. For use in a dark room, in conjunction with a camera having a single sheet of light sensitive material within a light-tight housing and shutter means controlling the exposure of said light sensitive material, for producing a plurality of separate latent photographic images on said light sensitive material, a copy holder comprising; a first support frame having spaced apart parallel guide rails affixed to its front face; at least one bar normal to said guide rails and connected therebetween for movement to a plurality of parallel positions; a second frame smaller than said first support frame for receiving copy material mounted on said bar for movement along the longitudinal axis of said bar; means for illuminating only the copy material received by said second frame to a degree sufficient for photographing; whereby the said second frame may be moved over the front face of said support frame, in a plane parallel to said front face, to a plurality of preselected positions relative to said camera each position being so selected that when an exposure on said single sheet of light sensitive material is made of the copy material at each of said preselected positions a plurality of separate latent images is formed on said sheet of light sensitive material.

4. For use in a dark room, in conjunction with a camera having a single sheet of light sensitive material within a light-tight housing and shutter means controlling the exposure of said light sensitive material, for producing a plurality of separate latent photographic images on said light sensitive material, a copy holder having a first support frame, a second frame for receiving copy material, means for illuminating only the copy material received by said second frame to a degree sufficient for photographing, a plurality of horizontally disposed parallel bars carried by said first frame, means connected to said second frame and engaging said parallel bars for horizontal movement of said second frame relative to said first frame, blocks riding in vertical guides carried by said first frame, said blocks carrying said parallel bars, cooperating locking means carried by said blocks and said vertical guides for selectively adjusting the vertical position of said blocks on said first frame and the relative position of said second frame on said first frame, whereby said second frame may be mounted successively on said first frame at a plurality of preselected positions relative to said camera, each position being selected so that an exposure of the copy material at each position will result in only a part of the area of the light sensitive material being exposed, and each position being further selected so that successive exposures of the copy material at the different positions do not result in double exposure of any substantial part of the sheet of light sensitive material.

References Cited in the file of this patent

UNITED STATES PATENTS

| | | |
|---|---|---|
| 954,290 | Huebner | Apr. 5, 1910 |
| 2,009,262 | Hetherington | July 23, 1935 |
| 2,296,655 | Stuart | Sept. 22, 1942 |
| 2,537,069 | Lohr | Jan. 9, 1951 |
| 2,740,324 | Cahill | Apr. 3, 1956 |
| 2,770,165 | Vriezelaar | Nov. 13, 1956 |
| 2,866,397 | Gillette | Dec. 30, 1958 |